United States Patent
Berets et al.

[11] 3,968,639
[45] July 13, 1976

[54] ELECTROCHROMIC INFORMATION DISPLAYS

[75] Inventors: Donald Joseph Berets; George Augustus Castellion; Gottfried Haacke, all of Stamford, Conn.

[73] Assignee: American Cyanamid Company, Stamford, Conn.

[22] Filed: July 16, 1974

[21] Appl. No.: 489,796

Related U.S. Application Data

[62] Division of Ser. No. 149,423, June 3, 1971, Pat. No. 3,839,857.

[52] U.S. Cl. .............................. 58/23 R; 58/127 R; 324/94; 350/160 R
[51] Int. Cl.² ................... G04C 3/00; G04B 19/06; G01R 27/22; G02F 1/28
[58] Field of Search ............. 58/23 R, 50 R, 127 R; 340/336, 378 R; 350/160 R; 324/94, 182

[56] References Cited
UNITED STATES PATENTS

| | | |
|---|---|---|
| 3,194,003 | 7/1965 | Polin .................................. 58/50 R |
| 3,589,896 | 6/1971 | Wilcox.................................. 96/1.5 |
| R28,199 | 10/1974 | Deb et al. ........................ 350/160 R |

FOREIGN PATENTS OR APPLICATIONS

| | | |
|---|---|---|
| 845,053 | 8/1960 | United Kingdom |

*Primary Examiner*—Edith Simmons Jackmon
*Attorney, Agent, or Firm*—Robert J. Feltovic

[57] ABSTRACT

Accumulating measuring devices which indicate the flow of electric current on graduated scale. Current flow may be of any fixed rate or value, steady or pulse, and scale may be any desired graduations. Current flow is indicated by a persistent electrochromic display material which changes color due to passage of electric current through it. The entire device is electronic, with no mechanical parts. Other accumulating functions may also be measured with the device if they can be converted first to electric current. One particular application is an elapsed time indicator, e.g. a watch or clock.

7 Claims, 17 Drawing Figures

ELECTROCHROMIC INFORMATION DISPLAYS

This application is a divisional application of U.S. Patent Application Ser. No. 149,423, filed June 3, 1971, now U.S. Pat. No. 3,839,857.

This invention relates to a device for measuring and indicating an accumulating function electronically without use of moving parts. The invention relates more particularly to a device having a persistent electrochromic display means for measuring electric current flow and indicating this flow on a graduated scale. More particularly, the invention relates to an elapsed time indicator such as a clock or a watch.

Many devices are known for measuring and displaying continuing functions, such as the odometer, electric meter, mechanical clock or watch, electric clock, electrolytic elapsed time indicators, and the like. These devices are either mechanical, a combination of electrical and mechanical means, having digital or analog registers or dials, or electrochemical in nature. A need has existed for a purely electronic device, for displaying an accumulating function.

It is therefore an object of this invention to provide completely electronic accumulating function indicator operating on electric current.

A further object is to provide such an indicator which has a persistent electrochromic display means.

Another object is to provide an electronic elapsed time indicator.

A further object is to provide a completely electronic watch or clock.

Another object is to provide an electronic watch which operates on very low voltage and current requirement over a relatively long period of time.

These and other objects of the invention will become apparent as the description thereof proceeds.

SUMMARY OF THE INVENTION

The invention comprises broadly the electronics means for sensing flow of electric current, either steady or pulse, and the display means for indicating the accumulating flow.

The electronics can be of various types, depending on the function to be measured and the manner in which it is to be displayed, i.e. as digital information, numbers, letters or the like, or as analog information on a marked dial. It is generally necessary to provide means for setting up a continuous, uniform flow of electric current, whether alternating or direct, or pulse. The current may come from a battery source, or line current. In one of the simplest applications, current will be passed to a persistent electrochromic display dial which colors in a continuously advancing line as a function of the current flow. By proper regulation of the current and appropriate graduations along the advancing line, elapsed time can be measured. When the display means is made in a circle, the display can function as a watch. The electronics may include logic to measure electric flow or count pulses and to activate switching devices to operate the visual display at desired intervals.

DETAILED DESCRIPTION OF THE INVENTION

The invention may be better understood by reference to the Figures in which

Figure 1:
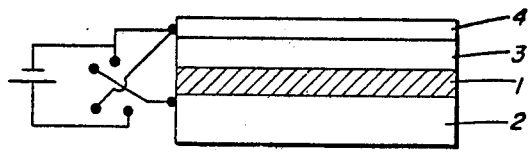
Figure 2:
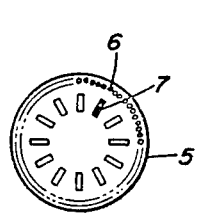
Figure 5:
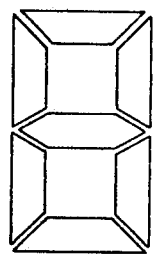
Figure 7:
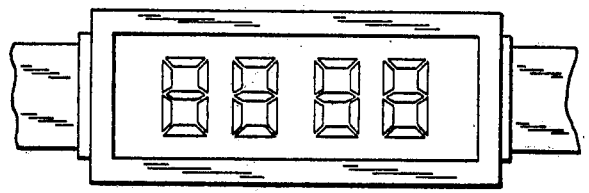
Figure 6:
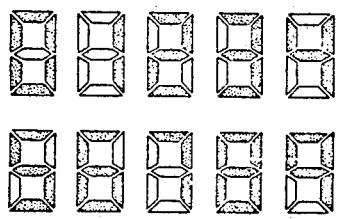
Figure 16:
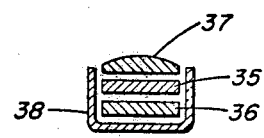
Figure 3:
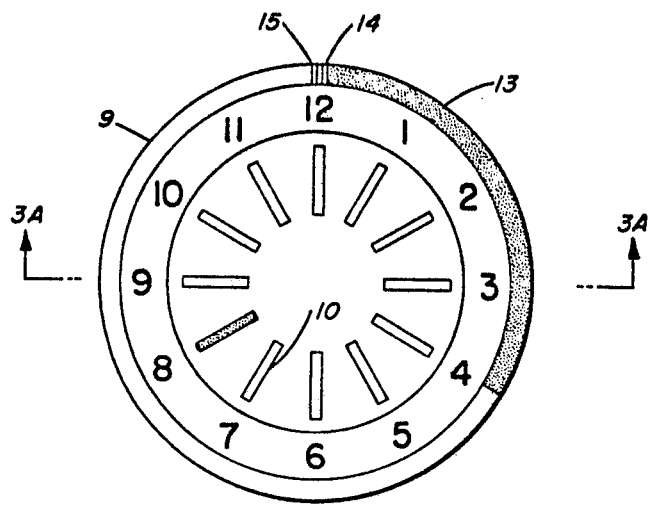
Figure 3A:
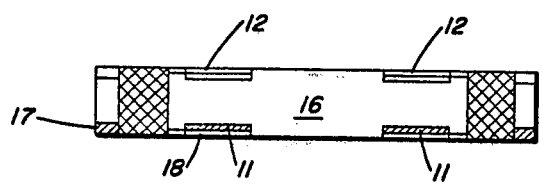
Figure 4:
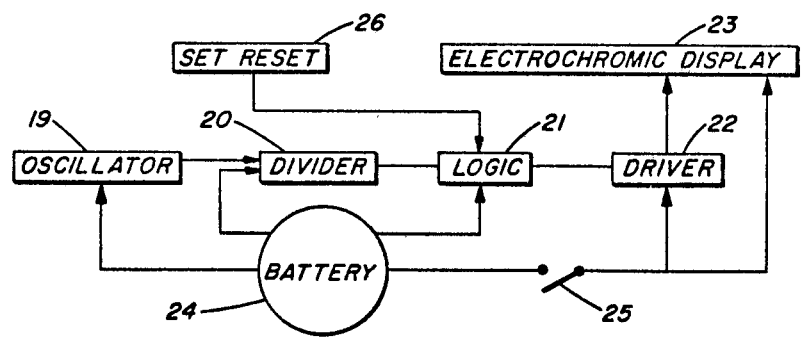
Figure 8:
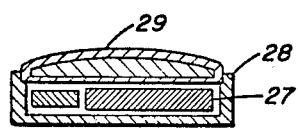
Figure 9:
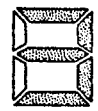
Figure 10:
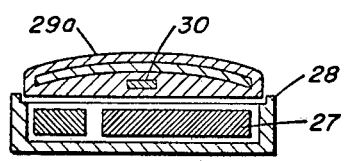
Figure 11:
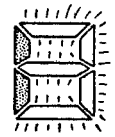
Figures 12, 13:
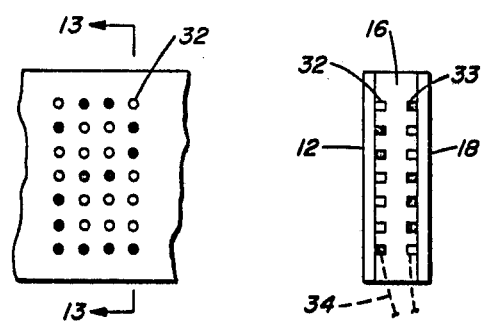
Figures 14, 15:
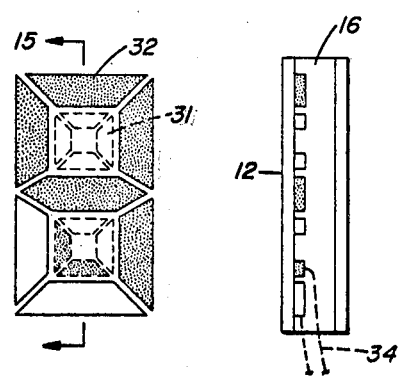

FIG. 1 is a cross section of a simple electronic current measuring device showing the electrochromic display means, FIG. 2 represents a watch or a clock face display using electrochromic dots for minutes and bars for hours, FIG. 3 shows a watch or clock face display using bars for hour display and an analog ring for minutes display, FIG. 3A is a cross-sectional view of the watch of FIG. 3 taken along the lines 3A—3A, FIG. 4 is a block circuit of a suitable circuit for a watch, clock or the like, FIG. 5 shows a seven bar matrix for displaying numerical digital information, FIG. 6 shows the numbers "0" through "9" displayed by means of a seven bar matrix, FIG. 7 shows a watch face utilizing an array of four seven bar matrices to display time, FIG. 8 shows a cross-sectional view of a battery operated electronic watch with an electrochromic display, FIG. 9 shows a seven bar matrix display with elements in a colored state to show the number "3" as displayed on the watch of FIG. 8, FIG. 10 shows a watch similar to that of FIG. 8, with means to light up the face, FIG. 11 shows a seven bar matrix in reverse mode with elements uncolored to represent a number "3" by the light shining through the face, FIG. 12 is a thirty-five dot matrix display colored to show the number "2", FIG. 13 is a cross-sectional view taken along the lines 13—13 of FIG. 12 showing coloration of electrochromic elements and counter-electrodes in different layers, FIG. 14 shows an electrochromic display matrix having display elements and counter-electrodes in the same plane and when displays the number "9", FIG. 15 is a cross-sectional view of the matrix of FIG. 14, showing coloration of the display elements and counter electrodes, FIG. 16 illustrates a compact watch having electronics and face display tailored to available commercial battery size.

Referring in greater detail to the Figures, An EC structure suitable for simple elapsed time measure is shown schematically in FIG. 1. The essential elements are: electrochromic (EC) layer, 1 most suitably a layer of $WO_3$ vacuum deposited to a thickness of $0.5 - 1.5\ \mu$ on a conductive glass support 2 such as commercially available NESA glass. Contacting the EC layer is the electrolyte-separator layer 3 which may be 0.01 – 10 mm thick, though generally the thinnest layer which can be prepared is preferred. The electrolyte-separator layer should have high protonic conductivity, which may be attained by use of inorganic acids or mixtures of acids, sulfuric acid having been found to be excellent in this use. To minimize cell leakage and to obtain other desirable rheological properties for construction and operation, mixtures of sulfuric acid with glycerine, ethylene glycol, and similar polyhydric alcohols have been effective. It is desirable in the electrolyte-separator layer to minimize water since water has a deleterious effect on the long term stability of the EC film. The counter-electrode 4 may be gold or the EC material itself, intimately mixed with an electronically conductive material, such as graphite, the composite powder being bound or fixed by another component in a way so as to achieve desired electrical and mechanical properties. One useful counter-electrode composition has been achieved by incorporating $WO_3$ powder and graphite in a fibrillated polytetrafluoroethylene binder as described in copending, commonly assigned application Ser. No. 105,882 filed Jan. 12, 1971. Another suitable form of electrochromic display device suitable is shown in U.S. Pat. No. 3,521,941.

The component parts 1, 2, 3, and 4 may be cut to desired size before assembly. Electrical wire contacts are made to 2 and 4, care being taken not to contaminate the EC layer or electrolyte with solder components, which might be injurious to EC performance. The entire assembly should then be hermetically encapsulated in a plastic glass, or metal container capable of being sealed so that short circuitry is avoided, corrosion of the case by the acid electrolyte is avoided, and a clear view by an observer may be obtained of the EC film. Glass, epoxy, and silicone combinations have been employed. It is important to avoid leakage of the electrolyte, even though it may be quite viscous, over a wide temperature range of operation, and it is also important to avoid excessive contamination of the components by air or water vapor after the assembly has been sealed.

It is evident that many geometrical arrangements of the components are possible, as shown in FIGS. 2, 3, 5, 7 and 13. In general, higher speeds of switching from the colorless to the colored EC state are attained by utilizing the most conductive glass 2 and maintaining the smallest separation between the counter-electrode 4 and the EC film 1.

To enhance contrast between the colored and uncolored states a pigment may be added to the electrolyte-separator 3. White $TiO_2$ pigment is suitable. An especially striking contrast is achieved by employing a yellow titanate pigment such as Sun Yellow C.

To actuate devices of this type, voltages of from 0.5 to 1.5 are desirable, with the coloring mode attained by making the EC film negative. To bleach the colored state, the voltage is reversed. The voltage from a mercury cell, 1.35 volts, is especially suitable.

The actuating voltage need only be applied long enough to pass through the device from 10 to 30 millicoulombs per $cm^2$ of EC film area. Such current passage will produce a deep blue color, with a reflectance for white light in the 5–20% range.

More complex information displays are made up by use of multiple components. For example, as shown in FIG. 2, an analog display of time, such as might be desirable for an electronic wrist watch 5, can be accomplished by utilizing an array of EC dots 6 or bars 7 to delineate the minutes and hours. Each EC element is separately connected to the circuitry via conducting paths etched in the conductive glass, the EC elements themselves having been deposited in register through a mask. The electrolyte-separator and counter-electrode elements are as in FIG. 1 and may be paired with corresponding EC elements or with appropriate design, they may be common to all EC elements.

FIG. 2 shows one arrangement of EC elements for analog display of time. 60 dots 6 around the perimeter show the minutes, each one coloring as that minute passes. 12 bars 7 interior to the dots show the hours, only one at a time being in the colored state. At the end of each hour, all dots will have been colored and are then bleached; the hour bar is also bleached and the succeeding one colored. The time shown is five minutes after 1 o'clock.

For the design of FIG. 2, in each hour all the dots and one bar are required to be put through a color-bleach cycle. A typical total area of EC display will be approximately 1 $cm^2$. The required 20 mC at 1.4 volts represents energy usage of less than 30 mA secs. This is an average power consumption of less than 10 $\mu$W. This does not include power required for the electronic circuitry of an electronic watch. Such a watch display will operate continuously and will not require either a "demand" switch for displaying the time or an exceptionally large battery. The battery can be from 0.7 to 1 V e.m.f., which can provide ample power for the entire watch for more than one year.

Another type of EC analog time read out is shown in FIGS. 3 and 3A. On face 9, hours are displayed by bars 10 which consist of $WO_3$ on NESA glass 12. Counter-electrodes 11 for the hour bars 10 are electrodes of $WO_3$. Minutes are displayed by a minute ring 13 also NESA glass 12. This open ring consists of a continuous $WO_3$ film and works like a timer. Two electrodes 14 and 15 are deposited at the ring ends near numeral 12 (printed or etched on NESA glass 12 and are insulated from each other (no electrolyte between electrodes). By applying a voltage between $-14$ and $+15$ electrode, coloration starts at $-$ and slowly moves towards $+$. By use of an electrolyte 16 a resistance match between the $WO_3$ ring and electrolyte is achieved so that low voltages can be used. The components are adjusted so that resistance and available voltage provide coloration of the complete ring in exactly one hour. The speed of coloration is also made constant over this period of time.

Under the above conditions, bleaching of the completely colored ring 13 may be accomplished by applying a proper voltage pulse between colored $WO_3$ ring 13 and the counter-electrode 17 as shown in drawing. The counter-electrode cannot be a full ring or else bleaching will start at $+$ and $-$ electrodes and prevent the rest of $WO_3$ from bleaching. It, therefore, should consist only of a short length located close to 6. All counter-electrodes are deposited on a NESA glass 18, such as gallic acid for use in certain electrochromic display device applications.

In addition to the gelled electrolytes described, acid or salt electrolytes may also be employed. Acids and salts compatible with the electrochromic material and counter-electrode are used. Such materials are described copending, commonly assigned application Ser. No. 41,154, filed May 25, 1970. The acids include for example:

1. Aqueous sulfuric acid solutions ranging from 0.1 to 12.0 molar.
2. Sulfuric acids solutions of propylene carbonate, acetonitrile, dimethyl formamide and other organic solvents compatible with sulfuric acid.
3. Strong organic acids, such as 2-toluene sulfonic acid, in propylene carbonate and other organic solvents.
4. Alkali metal or alkaline earth metals or rare earth metal salts, such as lithium perchlorate, nitrate, chloride, sulfate, etc., in organic solvents, such as acetonitrile and propylene carbonate.

A distinct advantage of the above-mentioned solvents is their dielectric and solubility properties leading to high conductivity and high capacity.

Counter Electrode

The counter electrode is one selected from a group of materials compatible with the electrolyte, as previously discussed, such as tungsten oxide or molybdenum oxide. It is advantageous to use the same material for both electrodes, although not necessary. In a preferred embodiment of the present invention tungsten oxide is employed for display and the same material as counter electrode is employed in contact with the electrolyte.

Electrodes shown to be useful in sulfuric acid are described in the article entitled "Reference Electrodes in Sulfuric Acid", Electrochemical Technology, May–June 1966, pp. 275–276.

A specific example of a counter electrode compatible with sulfuric acid and useful in the present invention consists of a porous lead metal plate.

Other electrodes which can be used in sulfuric acid are shown in Table I:

TABLE I

Mercury — Mercury (II) sulfate
Gold — Gold (I) oxide
Platinum — Platinum (II) oxide
Rhodium — Rhodium (III) oxide
Tungsten
Chromium (II) carbide
Zirconium — Zirconium (II) oxide
Platinum
Molybdenum
Tungsten (II) carbide
Tantalum (II) boride
Niobium
Palladium
Silicon — Silicon (II) carbide
Tantalum
Tantalum — Tantalum (V) oxide
Niobium — Niobium (V) oxide
Niobium (II) carbide
Hafnium (II) carbide EC is also utilizable in digital displays. Either matrix type (7 × 5 dot matrix) or segment type (7 segments in figure "8" pattern) can be employed as shown in FIGS. 5 to 7, and 12 to 15. These displays are similar in EC configuration to the analog displays, but they require switching many elements as each minute changes; hence they involve greater current drains. A demand switch may be required which would actuate the EC display only when the display of time is actually desired. FIG. 4 shows a block diagram for an electronic watch having a crystal oscillator 19, divider 20, logic 21, driver 22 and display elements 23, battery 24, demand switch 25, and set and reset button 26. The elements of the electronic watch circuit may vary somewhat, and the precise circuit design is not a part of this invention. Typical circuits are shown for example in U.S. Pat. Nos. 3,194,003; 3,258,906; 3,276,200; 3,485,033; or 3,505,804. A design as shown in FIG. 4 may be for example as follows:

The oscillator comprises a quartz oscillator operating at 32,768 Hz vibrations. These 32,768-Hz vibrations are first divided down to 1 Hz at 20 and then are fed into logic-pulse counting circuitry 21.

There are five counters in series, able to divide by 6, 10, and 12 units for second, minute, and hour counting. The last counter covers 12 hr. Each of the counters triggers the next sequence.

A part of the logic circuitry is a decoder, which takes the binary representation of a number and converts and encodes it for a 35-dot matrix display of each numeral. (FIG. 13). For example, "five" is represented by binary 1 and binary 4, and the decoder indicates that this is a five. When the demand switch 25 is activated, the driver 22 is activated and feeds power to the selected display elements at 23.

Logic circuitry consists of a number of individual hybrid substrates, which include integrated circuits:

The oscillator and countdown circuit divides the oscillator frequency down by a factor of two to a usable frequency. Five frequencies are provided by the 14-stage divider. An 8-Hz frequency, for example, is used by the second-counter circuit, while other higher and lower frequencies are fed to other circuits.

Operational control circuit controls the 1¼ seconds that hours and minutes are displayed on the watch face plus display of seconds beyond the basic interval. Another function is controlling setting of minutes, which also automatically resets seconds.

Seconds counter circuit is another logic substrate that counts the seconds that are displayed on command, and it also generates a signal to make the minutes display change from "59" to "00".

Minutes counter circuit counts the minutes and generates a signal to make the hours display change from "12" to "1".

Hours counter circuit counts the hours from "1" to "12".

Power switching circuit supplies power to six display decoders. The decoders-one for each digit-convert binary coded decimal information from the counter circuits into numbers. Each matrix has 35 dots, composed of electrochromic material.

As there is no conventional stem for winding and setting, time is reset by depressing a switch 26. There may be one switch to reset hours; and another, minutes and seconds.

The watch of FIG. 4 has a digital display of time as shown in FIG. 7, except using the dot matrix numerals of FIG. 12. It will be obvious that the bar matrix of FIGS. 5 to 7 or 14 can be used by use of appropriate switching means in logic unit 21.

As shown in FIGS. 8 through 11, the electronics may be a single integrated circuit package 27, fitting in case 28, with a battery 24. The display unit and crystal may be an integrated unit 29 fitting into case 28. Appropriate plug connections, not shown but which will be within the skill of the art, are provided to connect battery 24, electronics 27 and display 29. In FIG. 9, a bar matrix has been colored to show a number "3" in the normal manner.

The display unit 29A of FIG. 10 varies somewhat from that of FIG. 8, in that it includes an illumination means 30. By use of a transparent electrolyte the numerals can be displayed in reverse mode, as shown in FIG. 11, in an illuminated manner. For this variation, the display area surrounding the matrix will also have to be opaque. Moreover, a change of location of the counter electrodes 31 is made as shown in FIG. 14, so that they are in the same plane as display bars 32. In this application, all segments when not displaying time will be colored, and bleached to display time. This is possible in the present invention since the electrochromic material is persistent and requires no current to remain in the colored state.

In FIG. 12, a thirty-five dot matrix is shown with the number "2" colored. FIG. 13 shows a coloration of the dots 32 on the farthest right vertical line and the coloration of opposing counter electrodes 33 when both are of similar material such as tungsten oxide. Electric connections from one set of dots are represented symbolically at 34.

In FIG. 16 is shown an extremely compact timing device. The device is designed based on any small battery 35 to have the electronics 36 deposited on one side and the display 37 on the other and to fit in a case 38. Such a device could be extremely compact and useful where small size and light weight are desirable. Case 38 could be an encapsulating plastic material.

It will be obvious that numerous variations could be made by persons skilled in the art within the scope of the foregoing description. Other circuits could be employed for an electronic watch. A wall clock operable from line voltage is also possible with the proper logic. The invention is intended to include any combination of an elapsed electric current accumulator and means for its display.

We claim:

1. An electronic device for visually indicating accumulated electric current flow comprising means to establish a regulated electric current flow, and a graduated persistent electrochromic display means electrically connected to said electric current flow means, whereby said electrochromic display changes color in a continuously advancing manner as a function of said current flow, so as to indicate accumulated electric current flow.

2. The device of claim 1 wherein said means to establish a uniform electric current flow is a battery.

3. The device of claim 2 including oscillator means to establish a uniform rate of electrical pulses.

4. The device of claim 3 including means to count said pulses.

5. The device of claim 4 wherein said persistent electrochromic display means comprises a plurality of elements.

6. The device of claim 5 including switching means coupled to said electrochromic display for activating said display elements in a prescribed manner.

7. The device of claim 6 wherein said display elements are arranged so as to indicate elapsed time.

* * * * *